Patented Oct. 26, 1926.

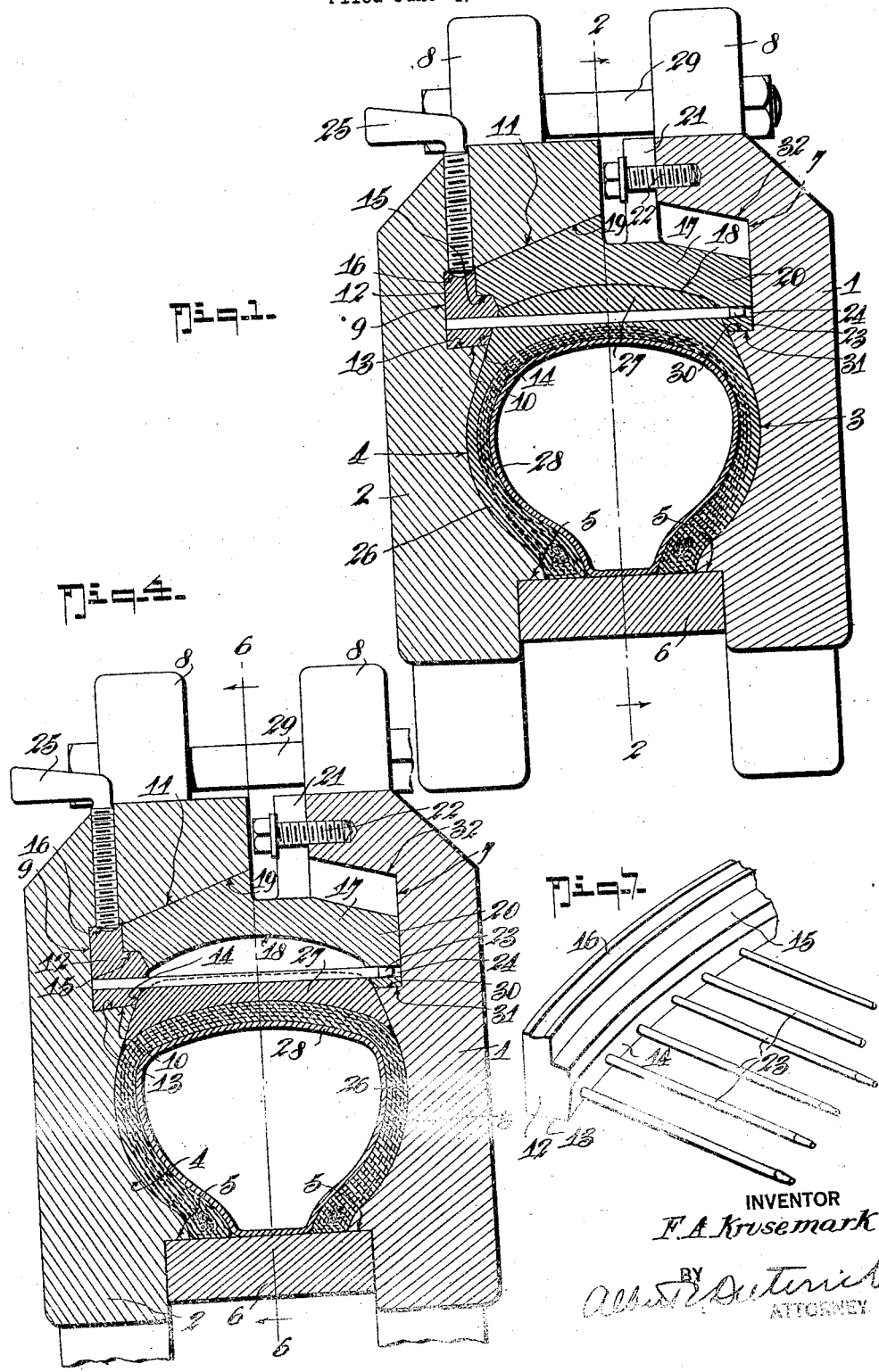

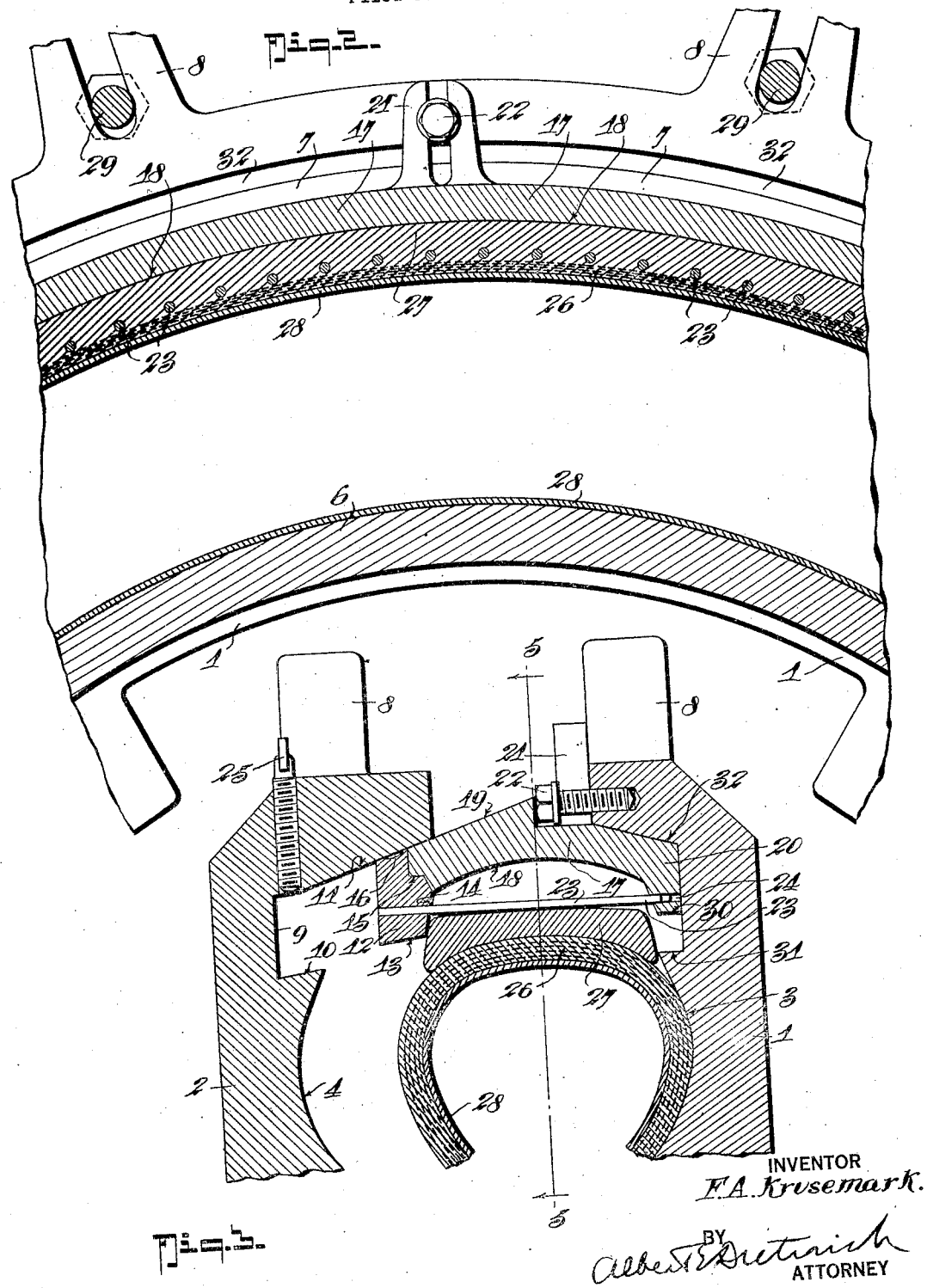

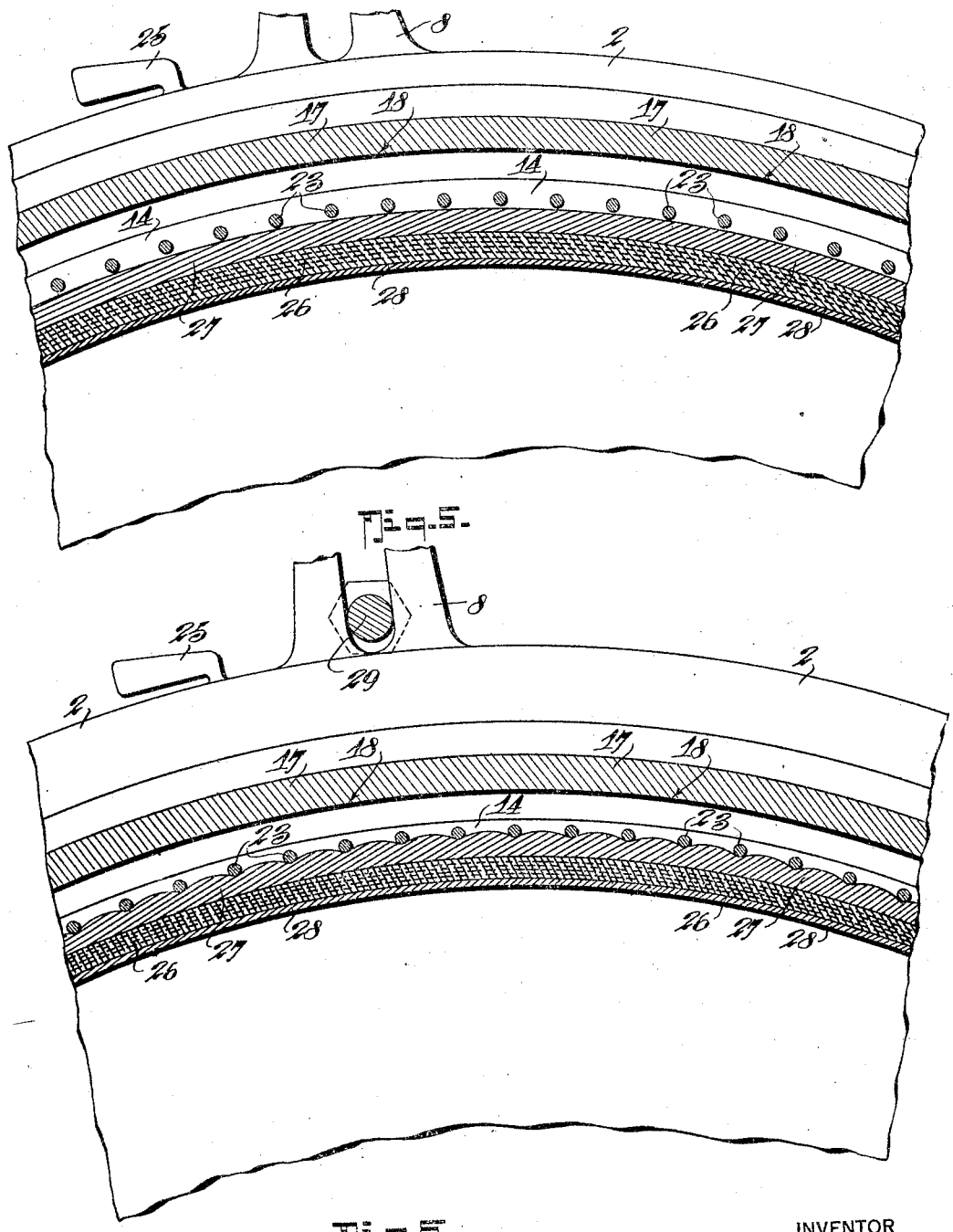

1,604,452

UNITED STATES PATENT OFFICE.

FREDERICK A. KRUSEMARK, OF AKRON, OHIO, ASSIGNOR TO LAMBERT TIRE & RUBBER CO., OF BARBERTON, OHIO, A CORPORATION OF ARIZONA.

MOLD FOR PNEUMATIC TIRES.

Application filed June 4, 1926. Serial No. 113,742.

My invention has for its object to provide an improvement on the type of molds disclosed in my application filed December 22, 1925, Serial No. 77,049, and it particularly has for its object to provide a mold of such character that the tread ring and pin-carrying ring may be assembled together and have such provision that as the mold is being closed the tread ring and the pins will be moved inwardly toward the axis of the mold, thereby forcing the peripheral portion of the tire inwardly and causing the pins to become imbedded within the tread portion of the tire during vulcanization.

Again it is an object to provide a mold of the character stated in which the pin-carrying ring may be locked to a mold side in order that the pins may be pulled from the tire at the same time the mold sides are separated.

Invention also resides in those novel features of construction, combination and arrangement of parts, all of which will be first fully described, then be specifically pointed out in the appended claims, reference being had to the accompanying drawings, in which:

Figure 1 is a vertical cross section of a tire mold embodying my invention and taken substantially on the line 1—1 on Figure 2.

Figure 2 is a vertical longitudinal section taken substantially in the line 2—2 of Figure 1.

Figure 3 is a diagrammatic view similar to Figure 1 showing the position of the parts after a tire has been placed in the mold and before the mold has been closed and the core bag expanded.

Figure 4 is a view similar to Figure 3 showing the position of the parts after the mold has been closed and before the core bag has been expanded.

Figure 5 is a detail vertical longitudinal section on the line 5—5 of Figure 3.

Figure 6 is a vertical longitudinal section on the line 6—6 of Figure 4.

Figure 7 is a detail perspective view of one section of the pin-carrying ring.

In the drawings, in which like numerals of reference designate like parts in all the figures, 1 and 2 represent the side mold members which have the respective side wall molding faces 3 and 4 and which are provided with the base ring shoulders 5 against which the base ring 6 fits.

7 is a tread ring groove in the side member 1, which groove is of greater area than the corresponding part of the tread ring so that the tread ring sections may move back and forth in radial direction. The mold parts are held together in the closed position by bolts 29 passing through lugs 8, or suitable clamps (not shown) may be used for the purpose.

9 designates the pin ring groove in the mold side member 2 for the reception of the pin ring 12, the groove 9 having an inner inclined surface 10 to match the corresponding surface 13 of the pin ring 12.

The pin ring 12 is made in sections and has a molding face 14 and a stepped wall 15 for engaging the corresponding wall of the tread ring 7, the latter being made in sections corresponding to those of the pin ring. The pin ring is also provided with a peripheral groove 16 to receive the clamp or holding screws 25 later referred to.

18 designates the molding face of the tread ring 17, and the tread ring 17 has an outer inclined circumferential surface 19 to fit the correspondingly inclined central circumferential surface 11 of the mold member 2. 20 designates that portion of the tread ring which lies in the groove 7 and is projected to oppose the molding face of the pin ring 12, the projection 20 having apertures 24 to receive the free ends of the pins 23 which are anchored in the pin ring 12.

The tread ring 17 is provided with holding lugs 21 radially slotted to permit the tread ring to move radially on the holding studs 22.

26 designates a tire, the tread portion of which is indicated by 27 and the core bag used for expanding the tire within the mold is numbered 28.

The tread ring has its projection 12 provided with a surface 30 to contact a corresponding surface 31 on the mold member 1 to limit the inward movement of the tread ring, the surface 32 of the mold member 1 limiting the outward movement of the tread ring.

In using my present molds for the manufacture of pneumatic tires possessing ventilated treads, the carcass of the tire is built up in the usual way and a slab of tread rubber is placed around the carcass, the quantity being calculated in order that it may be sufficient to form a tread of the desired dimensions. The sectional tread ring 17 is expanded, i. e. moved radially outward, and then the sectional pin ring 12 with its pins 23 is placed in position on the tread ring as shown in Figures 2, 3 and 5. The tire is then put in place and occupies the space within the circle of the pins 23. The mold side 2 is then positioned with respect to the other parts as shown in Figure 3 and the side mold members 1 and 2 are brought together (in any desired way as by use of bolts 29 or suitable clamps engaging the lugs 8).

By reason of the surfaces 11 and 19 being inclined, as the mold parts 1 and 2 are brought together, the tread ring 17 and the pin ring 12 with the pins 23 will be moved toward the center of the mold until arrested by contact of the surfaces 13—10 and the surfaces 30—31, at which time the adjacent ends of the respective tread ring and the respective pin ring sections will have been brought together. This movement inwardly of the pins 23 causes the periphery of the tire to be forced inwardly so that when the mold is fully closed there will be no rubber between the pins 23 and the molding face 18 except such as may be squeezed around the pins 23.

After the mold has been closed the core bag is expanded by inflating it with air or other fluid, thereby forcing the rubber of the tread outwardly or radially toward the tread ring. The rubber, when heated during the vulcanization process, becomes plastic and will flow between and around the adjacent pins 23 and fill the space to the tread ring molding surface 18 (see Figure 1), thus producing a full tire.

After vulcanization the core bag may be deflated, the mold unlocked, and after having first secured the ring sections 12 to the side mold 2 by the clamp screws 25, that mold side may be removed and at the same time the pins 23 will be pulled from the tread of the tire, thus leaving the vent holes in the tread of the tire clear.

The tread ring sections may then be prized apart and the tire removed from the mold side 1.

It will be seen that with my present mold I am able to quickly assemble a tire and mold and dissemble same after vulcanization, with a minimum effort, thus reducing labor costs.

What I claim is:

1. A mold comprising side members and a sectional tread ring associated with said side members, one of said side members having a recess in which said tread ring may be radially moved, the other side member having provision for contracting said tread ring as the side members are brought together, a sectional pin ring associated with said tread ring and with said other side member, means to cause said pin ring sections to move with said tread ring sections in expanding and contracting the same.

2. A mold comprising side members and a sectional tread ring associated with said side members, one of said side members having a recess in which said tread ring may be radially moved, the other side member having provision for contracting said tread ring as the side members are brought together, a sectional pin ring associated with said tread ring and with said other side member, means to cause said pin ring sections to move with said tread ring sections in contracting the same, and means whereby said pin ring may be anchored to said other side member at will.

3. A mold comprising side members and a sectional tread ring associated with said side members, one of said side members having a recess in which said tread ring may be radially moved, the other side member having provision for contracting said tread ring as the side members are brought together, a sectional pin ring associated with said tread ring and with said other side member, said tread ring having pin end receiving apertures, and said pin ring and tread ring having associated walls whereby to enable said pin ring sections to move with said tread ring sections in expanding and contracting the same.

4. A mold comprising side members and a sectional tread ring associated with said side members, one of said side members having a recess in which said tread ring may be radially moved, the other side member having provision for contracting said tread ring as the side members are brought together, a sectional pin ring associated with said tread ring and with said other side member, means to cause said pin ring sections to move with said tread ring sections in contracting the same, means whereby said pin ring may be anchored to said other side member at will, said anchoring means comprising retaining surfaces on said pin ring and said other side wall member and clamp screws on said other side wall member to engage said pin ring sections and hold the same in place.

5. A tire mold comprising side members, one side member having a tread ring receiving recess to permit radial expansion and contraction of a tread ring placed therein, a sectional tread ring located in part in said recess, means anchoring said tread ring to said one member when desired, the other side member having a tread ring engaging and contracting wall and a pin ring recess, a sectional pin ring adapted to fit said recess, said pin ring and said tread ring having engaging parts, pins carried by said pin ring, said tread ring having a projection with apertures to receive the free ends of said pins, thereby connecting the pin ring to the tread ring to move radially with it.

6. A tire mold comprising side members, one side member having a tread ring receiving recess to permit radial expansion and contraction of a tread ring placed therein, a sectional tread ring located in part in said recess, means anchoring said tread ring to said one side member when desired, the other side member having a tread ring engaging and contracting wall and a pin ring recess, a sectional pin ring adapted to fit said recess, said pin ring and said tread ring having engaging parts, pins carried by said pin ring, said tread ring having a projection with apertures to receive the free ends of said pins, thereby connecting the pin ring to the tread ring to move radially with it, and means securing said tread ring to said one side member.

7. A mold comprising side members and a sectional tread ring associated with said side members; means to cause the said tread ring sections to move radially when placed in engagement with the said side members; a sectional pin ring associated with said tread ring and means to cause said pin ring sections to move with said tread ring sections in contracting the same.

FREDERICK A. KRUSEMARK.